United States Patent
Kozaki

(10) Patent No.: US 10,474,143 B2
(45) Date of Patent: Nov. 12, 2019

(54) ROTOR LIFE ESTIMATION DEVICE AND VACUUM PUMP

(71) Applicant: Shimadzu Corporation, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 211 days.

(21) Appl. No.: 15/619,928

(22) Filed: Jun. 12, 2017

(65) Prior Publication Data
US 2017/0371330 A1 Dec. 28, 2017

(30) Foreign Application Priority Data
Jun. 28, 2016 (JP) .................... 2016-127254

(51) Int. Cl.
G05B 23/02 (2006.01)
G01K 13/08 (2006.01)
G01L 1/18 (2006.01)
F04D 19/04 (2006.01)
F04D 29/26 (2006.01)

(52) U.S. Cl.
CPC ......... *G05B 23/0283* (2013.01); *G01K 13/08* (2013.01); *G01L 1/18* (2013.01); *F04D 19/04* (2013.01); *F04D 29/26* (2013.01)

(58) Field of Classification Search
CPC ... G05B 23/0283; F04D 27/001; F04D 19/04; F04D 29/26; G01K 13/08; G01L 1/18; F05D 2270/303
See application file for complete search history.

(56) References Cited

U.S. PATENT DOCUMENTS

| 5,042,295 A | * | 8/1991 | Seeley | ............... | G07C 3/00 |
| | | | | | 701/100 |
| 6,416,290 B1 | * | 7/2002 | Yamauchi | ............ | F04D 19/04 |
| | | | | | 415/118 |

FOREIGN PATENT DOCUMENTS

| JP | 62-085839 A | 4/1987 |
| JP | 10-266991 A | 10/1998 |
| JP | 10-293049 A | 11/1998 |
| JP | 2004-116319 A | 4/2004 |
| JP | 2006-083825 A | 3/2006 |

OTHER PUBLICATIONS

Japanese Office Action for corresponding Application No. 2016-127254, dated Aug. 28, 2019.

* cited by examiner

*Primary Examiner* — Jennifer E Simmons
*Assistant Examiner* — Leo T Hinze
(74) *Attorney, Agent, or Firm* — Renner, Otto, Boisselle & Sklar, LLP

(57) ABSTRACT

A rotor life estimation device of a vacuum pump including a rotor rotatably driven by a motor and a rotor temperature detection section configured to detect a temperature of the rotor, comprises: an arithmetic section configured to calculate a strain equivalent corresponding to creep strain of the rotor based on a correlation between a creep strain speed equivalent and the temperature of the rotor and the temperature detected by the rotor temperature detection section; an estimation section configured to estimate a rotor life based on the calculated strain equivalent; and a providing section configured to provide information on the estimated rotor life.

11 Claims, 15 Drawing Sheets

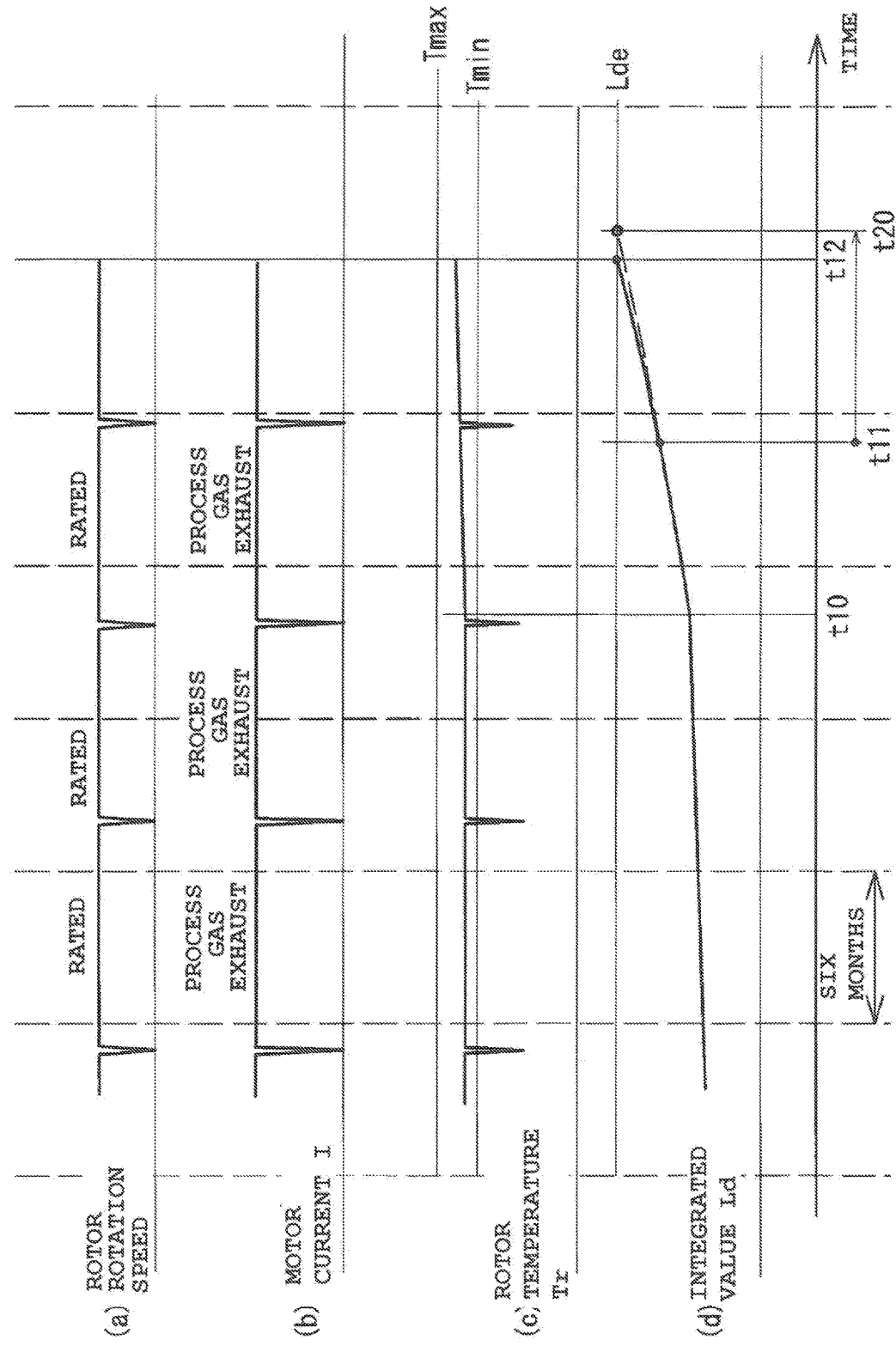

ROTOR LIFE ESTIMATION DEVICE AND VACUUM PUMP

BACKGROUND OF THE INVENTION

1. Technical Field

The present invention relates to a rotor life estimation device and a vacuum pump.

2. Background Art

In a turbo-molecular pump, a rotor is made of an aluminum material, and therefore, a relatively-low acceptable temperature unique to the aluminum material is exhibited. Typically, in a high-speed rotation state in which the turbo-molecular pump exerts an exhaust effect, the rotor is in a high tensile stress state due to a high centrifugal force effect. In the tensile stress state, when a rotor temperature reaches equal to or higher than an acceptable temperature (e.g., 120° C.), permanent strain rapidly increases. That is, the speed of creep deformation cannot be ignored. For this reason, operation is made at a temperature lower than the acceptable temperature.

Conversely, when operation is continued at a temperature of equal to or higher than the acceptable temperature, creep strain of the rotor increases, and the dimensions of each portion of the rotor increase. This leads to smaller dimensions of a clearance between a rotor blade and a stator blade. As a result, there is a probability that the stator blade and the rotor blade contact each other in high-speed rotation.

In a vacuum pump described in Patent Literature 1 (JP-A-2006-83825), a ferromagnetic body having a Curie temperature substantially equal to an acceptable temperature of a rotor is, for preventing the above-described trouble in advance, provided at the rotor. When a cumulative time of a time for which a change in the inductance of the ferromagnetic body is detected exceeds an acceptable time set in advance based on a creep life design of the rotor, rotor rotation is stopped.

However, the vacuum pump described in Patent Literature 1 is configured such that pump operation is stopped at the timing at which a rotor damage risk due to a creep life becomes extremely high, and the timing at which pump operation is stopped cannot be grasped in advance. For this reason, preparation for rotor maintenance cannot be performed in advance, leading to a difficulty in smooth maintenance.

SUMMARY OF THE INVENTION

A rotor life estimation device of a vacuum pump including a rotor rotatably driven by a motor and a rotor temperature detection section configured to detect a temperature of the rotor, comprises: an arithmetic section configured to calculate a strain equivalent corresponding to creep strain of the rotor based on a correlation between a creep strain speed equivalent and the temperature of the rotor and the temperature detected by the rotor temperature detection section; an estimation section configured to estimate a rotor life based on the calculated strain equivalent; and a providing section configured to provide information on the estimated rotor life.

The vacuum pump further includes a time counting section configured to generate time information on detection timing of the temperature. A storage section is further provided, which is configured to store, in a data storage area, a plurality of data sets each including the time information and the strain equivalent for a plurality of temperatures detected over time by the rotor temperature detection section, and the estimation section estimates a temporal change in a future strain equivalent based on the plurality of data sets stored in the storage section, and estimates the rotor life when the future strain equivalent reaches a strain equivalent threshold set as the rotor life.

The rotor life estimation device further comprises: a time counting section configured to generate time information on detection of timing of acquiring the temperature, the temperature being acquired from the rotor temperature detection section; and a storage section configured to store, in a data storage area, a plurality of data sets each including the time information and the strain equivalent for a plurality of temperatures detected over time by the rotor temperature detection section. The estimation section estimates a temporal change in a future strain equivalent based on the plurality of data sets stored in the storage section, and estimates the rotor life when the future strain equivalent reaches a strain equivalent threshold set as the rotor life.

The rotor life estimation device further comprises: a data processing section configured to more weight a data set including the time information closer to a time estimated by the estimation section, the data set being included in the plurality of data sets.

The data processing section performs averaging processing of reducing the number of the plurality of data sets stored in the storage section, and newly stores data sets in a free space of the data storage area generated by the averaging processing.

The time information is a cumulative rotor drive time as a cumulative value of a time for which the rotor is rotatably driven under a predetermined condition.

The estimation section estimates a remaining life from an estimation point to a lapse of the rotor life based on a difference between a strain equivalent threshold set as the rotor life and the strain equivalent.

The rotor life estimation device further comprises: an input section to which actual strain measurement data of the rotor is input; and a correction section configured to correct the strain equivalent calculated by the arithmetic section based on the actual strain measurement data.

The rotor life estimation device according to claim 3, further comprises: a data processing section configured to more weight a data set including the time information closer to a time estimated by the estimation section, the data set being included in the plurality of data sets.

The data processing section performs averaging processing of reducing the number of the plurality of data sets stored in the storage section, and newly stores data sets in a free space of the data storage area generated by the averaging processing.

The time information is a cumulative rotor drive time as a cumulative value of a time for which the rotor is rotatably driven under a predetermined condition.

A rotor life estimation device for estimating a life of a rotor of a vacuum pump, comprises: an estimation section configured to estimate the rotor life based on a plurality of data sets each including actual strain measurement data of the rotor and time information in actual strain measurement; and a providing section configured to provide information on the estimated rotor life.

A vacuum pump comprises: a rotor rotatably driven by a motor; a rotor temperature detection section configured to detect a temperature of the rotor; and the rotor life estimation device.

BRIEF DESCRIPTION OF THE DRAWINGS

FIG. 7 is a graph of an example of a long-term operation state of the vacuum pump loaded on a semiconductor manufacturing device;

DETAILED DESCRIPTION OF THE EXEMPLARY EMBODIMENTS

Hereinafter, embodiments of the present invention will be described with reference to the drawings.

First Embodiment

Figure 1:
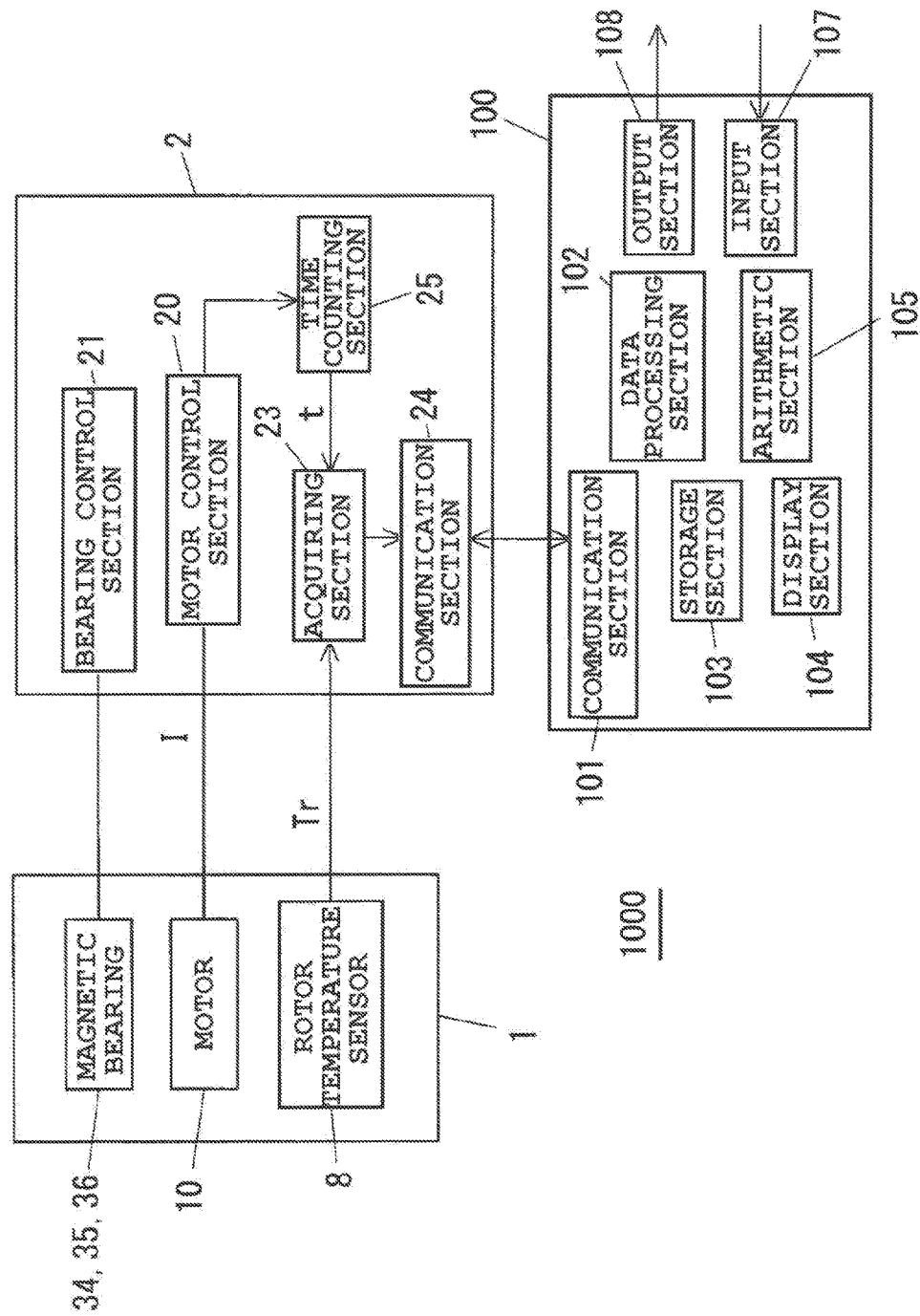
FIG. 1 is a block diagram of an outline configuration of a vacuum pump.

FIG. 1 is a block diagram of an outline configuration of a vacuum pump 1000. The vacuum pump 1000 includes a pump main body 1, a control unit 2 configured to drive and control the pump main body 1, and a rotor life estimation device 100. A magnetic bearing turbo-molecular pump will be described as an example in the present embodiment, but the present invention is not limited to the turbo-molecular pump as long as the pump is a vacuum pump including a rotor configured to rotate at high speed.

Figure 2:
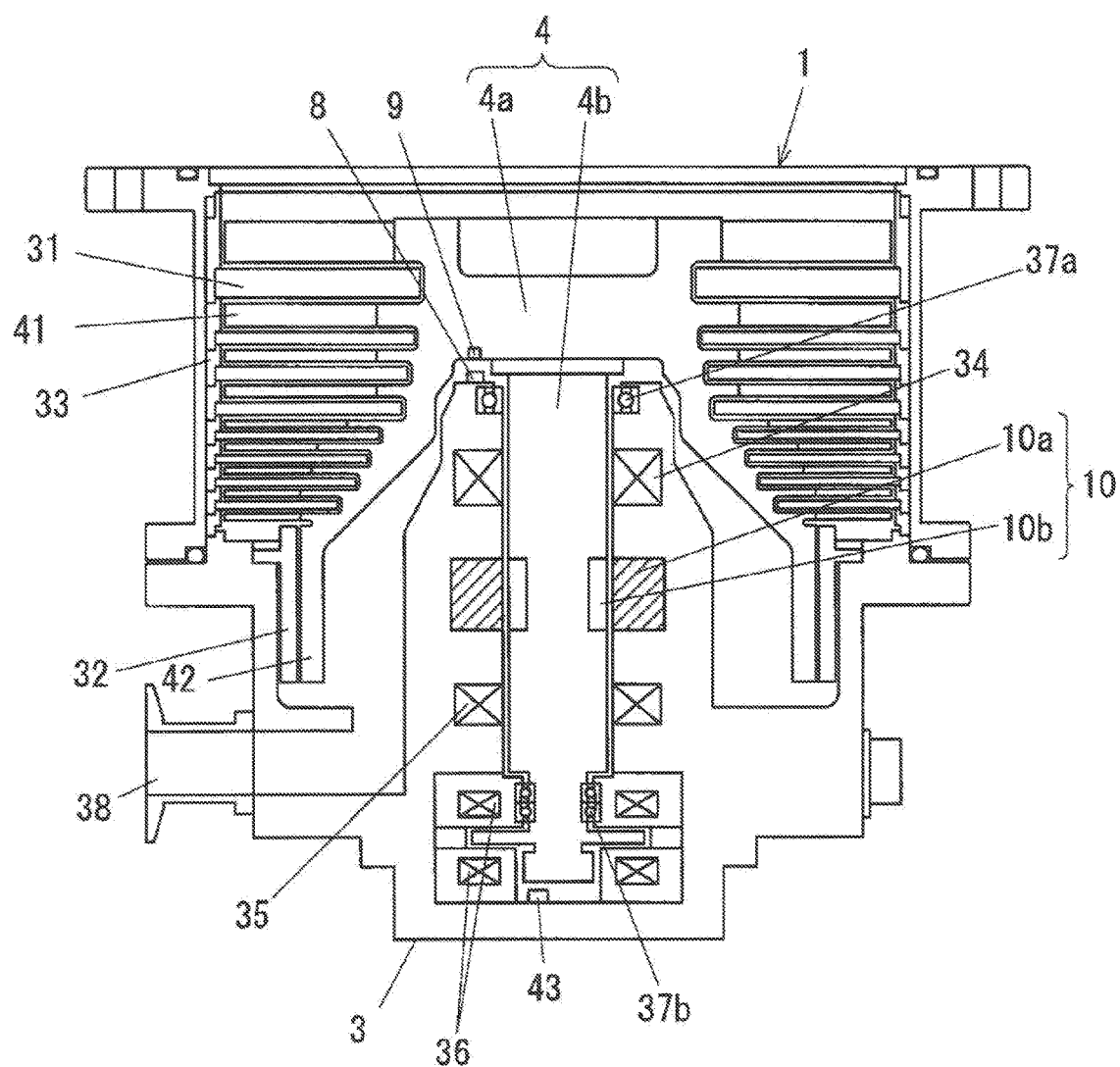
FIG. 2 is a cross-sectional view of an example of a pump main body.

FIG. 2 is a cross-sectional view of an example of the pump main body 1. The pump main body 1 includes a turbo pump stage having rotor blades 41 and stationary blades 31, and a screw groove pump stage having a cylindrical portion 42 and a stator 32. In the screw groove pump stage, a screw groove is formed at the stator 32 or the cylindrical portion 42. The rotor blades 41 and the cylindrical portion 42 are formed at a pump rotor 4a. The pump rotor 4a is fastened to a shaft 4b. The pump rotor 4a and the shaft 4b form a rotor unit 4.

The stationary blades 31 and the rotor blades 41 are alternately arranged in an axial direction. The stationary blades 31 are stacked on each other in the pump axial direction with a spacer ring 33 being interposed between adjacent ones of the stationary blades 31. The shaft 4b is non-contact supported by magnetic bearings 34, 35, 36 provided at a base 3. Although not specifically shown in the figure, each of the magnetic bearings 34 to 36 includes electromagnets and a displacement sensor. The displacement sensor is configured to detect a levitation position of the shaft 4b. The rotation speed (the rotation speed per second) of the shaft 4b, i.e., the rotor unit 4, is detected by a rotation sensor 43.

The rotor unit 4 is rotatably driven by a motor 10. The motor 10 includes a motor stator 10a provided at the base 3, and a motor rotor 10b provided at the shaft 4b. When the magnetic bearings are not in operation, the shaft 4b is supported by emergency mechanical bearings 37a, 37b. When the rotor unit 4 is rotated at high speed by the motor 10, gas on a pump suction port side is sequentially exhausted by the turbo pump stage (the rotor blades 41, the stationary blades 31) and the screw groove pump stage (the cylindrical portion 42, the stator 32), and then, is discharged through an exhaust port 38.

The temperature of the pump rotor 4a is detected by a rotor temperature sensor 8. Since the pump rotor 4a is magnetically levitated and rotated at high speed as described above, a non-contact temperature sensor is used as the rotor temperature sensor 8. For example, as described in JP-A-2006-194094, a non-contact temperature sensor is used, which utilizes a great change in permeability of a ferromagnetic target around a Curie temperature. The rotor temperature sensor 8 is an inductance sensor, and is configured to detect, as an inductance change, the change in the permeability of the target 9 provided at the pump rotor 4a. The target 9 is made of a ferromagnetic body. Note that the target 9 facing the rotor temperature sensor 8 may be provided at the position of the shaft 4b.

Figure 3A:
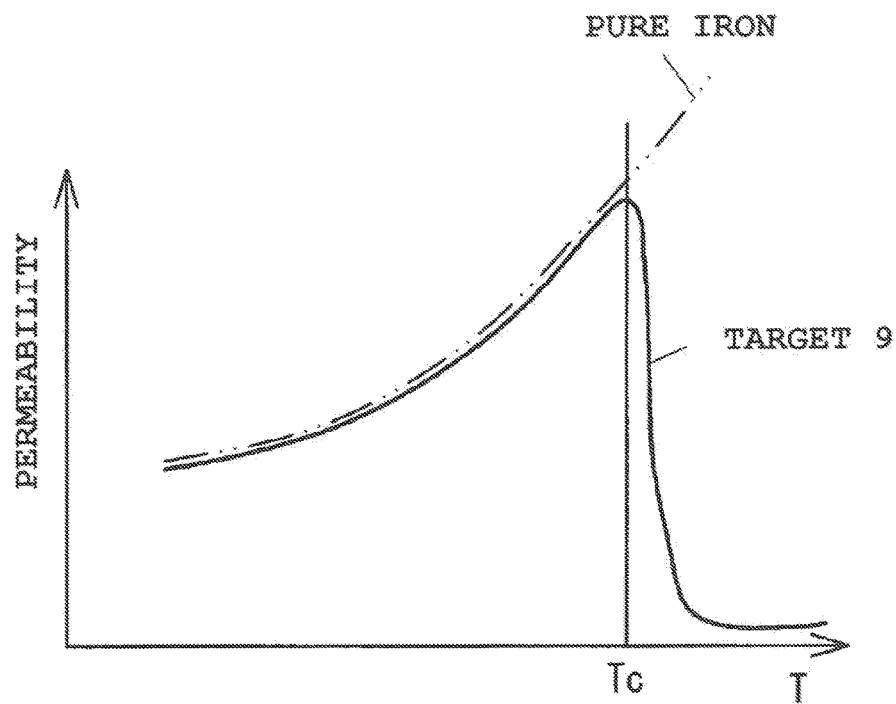
FIGS. 3A and 3B are graphs for describing properties of a target used for a rotor temperature sensor.
Figure 3B:
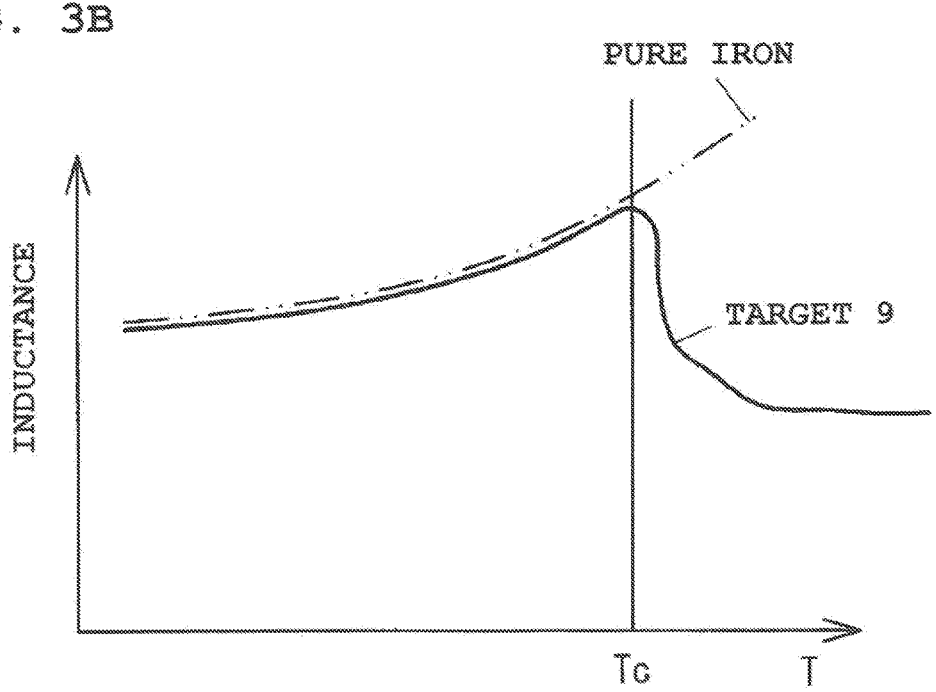

For example, when the temperature of the target 9 provided at the pump rotor 4a exceeds the Curie temperature Tc, the permeability of the target 9 significantly changes around the Curie temperature Tc. FIG. 3A is a graph of an example of the permeability change at the Curie temperature Tc. When the permeability of the target 9 changes in a magnetic field formed by the rotor temperature sensor 8 as shown in figure, the inductance of the rotor temperature sensor 8 changes as in FIG. 3B. As a result, a carrier wave applied to the rotor temperature sensor 8 is amplitude-modulated by the permeability change. The amplitude-modulated carrier wave output from the rotor temperature sensor 8 is detected and rectified so that a signal change corresponding to the permeability change can be detected.

Figure 4:
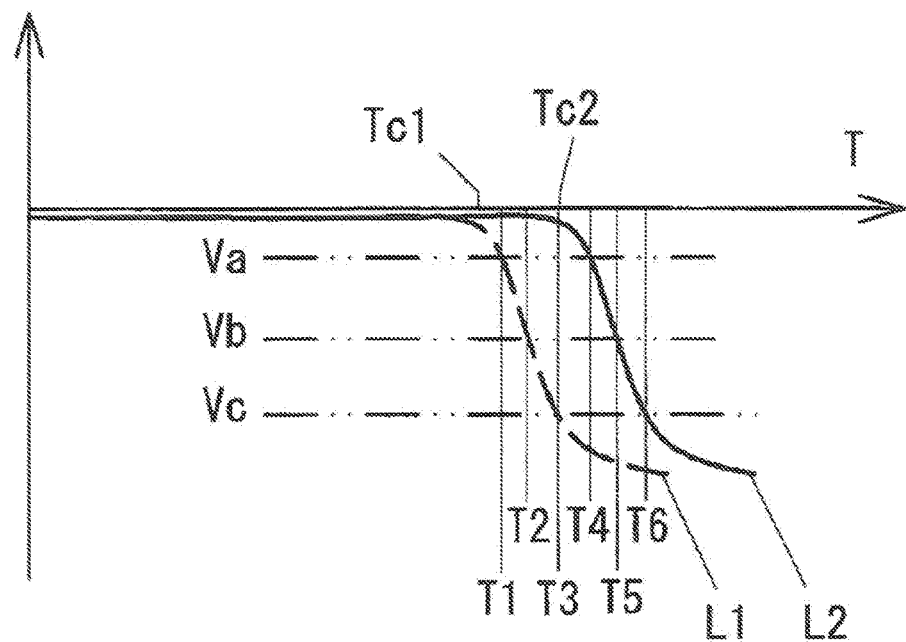
FIG. 4 is a graph for describing the case where multiple temperatures T1 to T6 are detected using two types of ferromagnetic targets.

FIG. 4 shows an example when multiple temperatures T1 to T6 are detected using two types of ferromagnetic targets with Curie temperatures of Tc1, Tc2. Curves L1, L2 respectively show the change in the permeability of two ferromagnetic targets. Note that FIG. 4 shows, as the curve L1, L2, a difference signal between a signal for the ferromagnetic target and a signal for a pure iron target (see FIG. 3B) when the pure iron target is provided in addition to the ferromagnetic target. Straight lines Va, Vb, Vc indicate thresholds for temperature detection. A temperature at an intersection between the curve L1 and the threshold Va, Vb, Vc is T1, T2, T3, and a temperature at an intersection between the curve L2 and the threshold Va, Vb, Vc is T4, T5, T6.

As described above, the rotor temperature sensor 8 is configured to detect the permeability (a temperature equivalent) as a physical amount corresponding to the temperature of the pump rotor 4a. However, the rotor temperature sensor 8 is not limited to the above-described configuration, and various types of temperature sensors can be used as the rotor temperature sensor 8 as long as the temperature of the pump rotor 4a can be non-contact detected.

As illustrated in FIG. 1, the control unit 2 includes a motor control section 20, a bearing control section 21, an acquiring section 23, a communication section 24, and a time counting section 25. The motor 10 is controlled by the motor control section 20. The magnetic bearings 34 to 36 are controlled by the bearing control section 21. The acquiring section 23 is configured to acquire a rotor temperature equivalent signal (a signal modulated using the inductance) from the rotor temperature sensor 8, thereby converting such a signal into a temperature value (hereinafter referred to as a "rotor temperature Tr").

The time counting section 25 is configured to generate time information on the timing of temperature detection by the rotor temperature sensor 8. The time information includes, for example, a temperature detection time and a cumulative rotor drive time as a cumulative value of a drive time of the pump rotor 4a. The case of using the cumulative rotor drive time will be described below, and the case of using the detection time will be described later. Note that the cumulative rotor drive time is a cumulative value of a time for which a rotor rotation speed might lead to creep strain. The cumulative rotor drive time includes, for example, a cumulative time when the rotor rotation speed falls within a predetermined range (e.g., a predetermined rotation speed range including a rated rotation speed), as well as including, as a simpler method, a cumulative value of a time from a start signal to a stop signal for pump rotation. This cumulative time (hereinafter referred to as the "cumulative rotor drive time") is manually reset when the pump rotor 4a is replaced. After replacement, the cumulative rotor drive time for the new pump rotor 4a is measured by the time counting section 25. The acquiring section 23 outputs a data set (Tr, t) to the rotor life estimation device 100 via the communication section 24, the data set (Tr, t) including the rotor temperature Tr and a cumulative rotor drive time t when the rotor temperature Tr is acquired. For example, the rotor temperature Tr is repeatedly acquired at a predetermined time interval $\Delta t$, and a data set (Tr, $n\Delta t$) is sequentially output. Note that n=1, 2, . . . is satisfied. Moreover, the case of $t=n\Delta t$, i.e., the case of being constantly in an operation state, has been described above. Unless otherwise specified, description will be made liming to the case where the pump is constantly in the operation state and the cumulative rotor drive time $t=n\Delta t$ is satisfied.

The rotor life estimation device 100 is a device configured to estimate the life of the pump rotor 4a. The rotor life estimation device 100 includes a communication section 101, a data processing section 102, a storage section 103, a display section 104, an arithmetic section 105, an input section 107, and an output section 108. Note that in the present embodiment, the rotor life estimation device 100 is configured such that power is supplied from the control unit 2. When the control unit 2 is powered ON, the rotor life estimation device 100 is also turned ON. Needless to say, it may be configured such that power is supplied from other units than the control unit 2.

The data set (Tr, t) output from the communication section 24 is input to the rotor life estimation device 100 via the communication section 101. The data set (Tr, t) input from the communication section 101 is, in the arithmetic section 105, converted into a data set D(Ld, t) including an integrated strain value Ld and the cumulative rotor drive time t. The converted data set D(Ld, t) is stored in the storage section 103. Note that arithmetic processing of the integrated strain value Ld will be described later in detail.

Note that a data storage capacity for the data set D (Ld, t) in the storage section 103 is limited. For this reason, when multiple data sets D (Ld, t) are stored up to the assigned data storage capacity, the processing of reducing the already-stored data sets D(Ld, t) is, in the data processing section 102, performed to store new data sets D(Ld, t). The reduction processing will be described later in detail.

The arithmetic section 105 is configured to estimate, based on the multiple data sets D(Ld, t) stored in the storage section 103, the timing at which the rotor life of the pump rotor 4a is elapsed. Such estimation processing will be described later in detail. Information on the rotor life is displayed on the display section 104. Moreover, the information on the rotor life is also output from the output section 108. Data on rotor life estimation is input from the input section 107.

(Description of Rotor Life Estimation)

At the aluminum pump rotor 4a under high-temperature high-tensile-stress environment, the creep strain due to the centrifugal force increases, and the radius dimension of each portion (particularly a portion with great stress) of the pump rotor 4a increases. As a result, a clearance between the pump rotor 4a and a stationary portion (the stationary blades 31, the stator 32, etc.) is narrowed.

Figure 5:
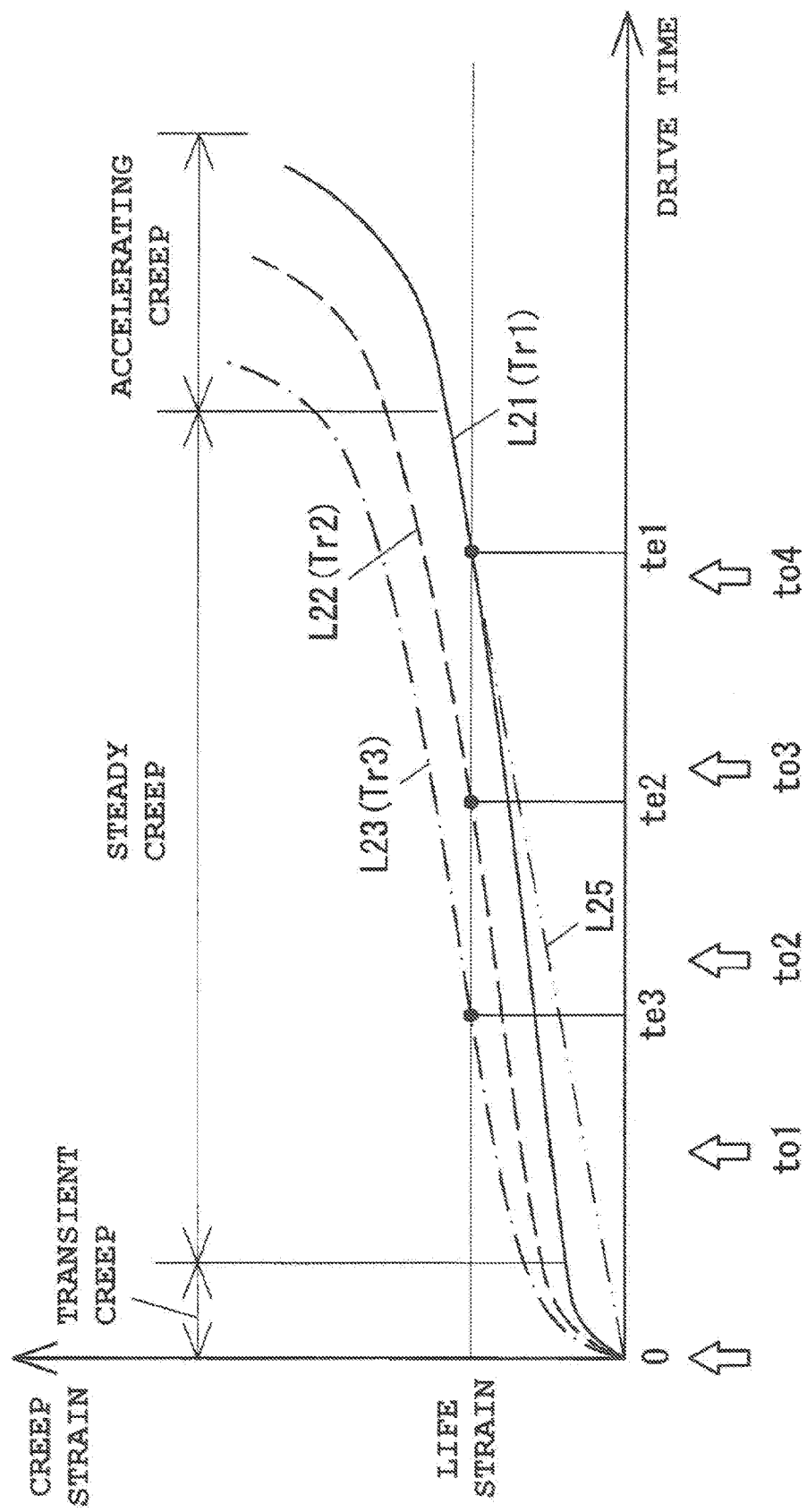
FIG. 5 is a graph for schematically showing the trend of creep progression in a typical constant high-temperature high-tensile-stress state.

FIG. 5 schematically shows the trend of creep progression in a typical constant high-temperature high-tensile-stress state. Strain caused at the pump rotor 4a in rotor rotation includes elastic strain and creep strain as permanent strain, but the creep strain relating to the rotor life will be mainly described below. The vertical axis of FIG. 5 represents the creep strain, and the time represented by the horizontal axis of FIG. 5 corresponds to the cumulative rotor drive time.

Curves L21, L22, L23 show the cases of rotor temperatures of Tr1, Tr2, Tr3 (Tr1<Tr2<Tr3), respectively. As shown in FIG. 5, there are three states substantially divided as follows: transient creep is caused for a relatively short period of time, and then, steady creep gradually progressing at a substantially constant speed is caused; and then, accelerating creep progresses at an accelerating rate.

Normally, the pump rotor 4a is designed within the range of the steady creep. Life strain in the present embodiment means creep strain when the pump rotor 4a eventually reaches a critical region where the pump rotor 4a might contact the stationary blades 31 or the stator 32 in the process of narrowing a clearance between a rotary side and a stationary side due to the steady creep. Such life strain is determined by a pump design. The life is te1 in use at the constant rotor temperature Tr1, the life is te2 in use at the constant rotor temperature Tr2, and the life is te3 in use at the constant rotor temperature Tr3.

Figure 6A:
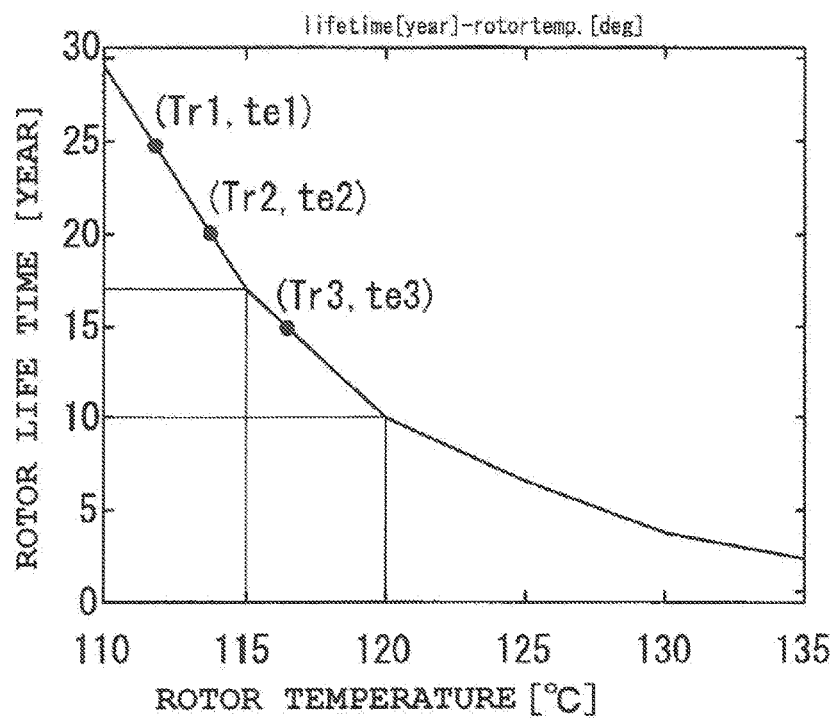
FIGS. 6A and 6B are graphs of a relationship among a rotor temperature, a rotor life time, and an inverse value of the rotor life time.

FIG. 6A is a graph of a relationship between the cumulative rotor drive time (hereinafter referred to as a "rotor life time") until a lapse of the rotor life due to the creep strain and the rotor temperature Tr. The rotor life time becomes shorter as the rotor temperature Tr increases. This means that an increase in the rotor temperature Tr results in a higher creep strain speed as seen from the slope (i.e., the creep strain speed) of each of the curves L21 to L23 for the steady creep of FIG. 5. A point (Tr1, te1), (Tr2, te2), (Tr3, te3) in FIG. 6A represents the rotor life time in the case of the curve L21, L22, L23 of FIG. 5.

Figure 6B:
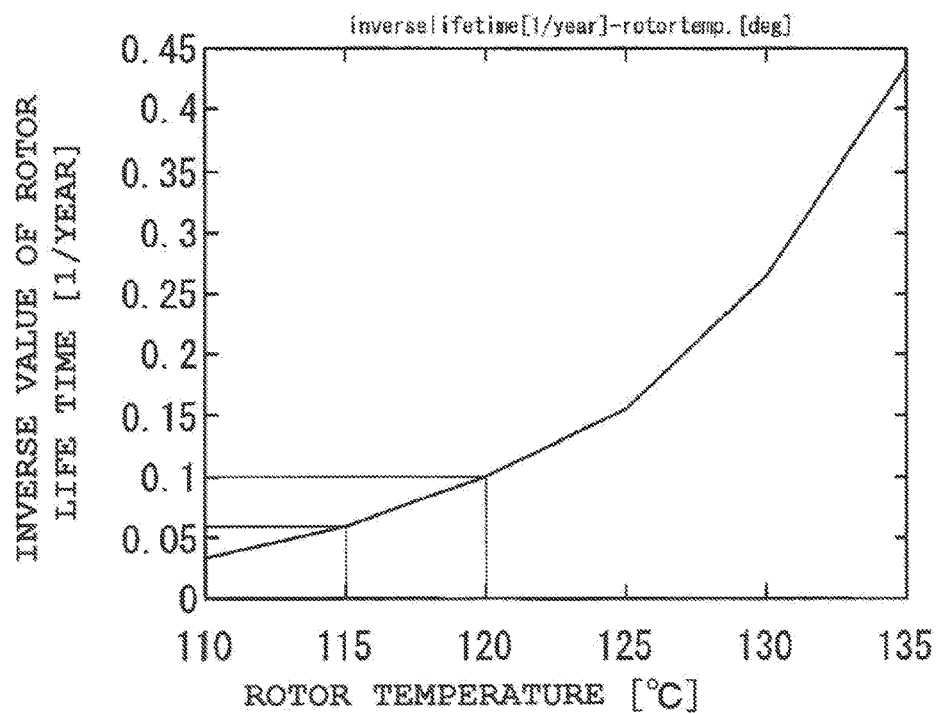

Regarding the rotor life time of FIG. 6A, FIG. 6B shows a relationship between an inverse value of the rotor life time and the rotor temperature Tr. The inverse value of the rotor life time corresponds to the creep strain per year, supposing that the creep strain until a lapse of the rotor life is 1 and that the strain speed is constant. That is, for the curve L21, this case corresponds to a case on the supposition that the strain changes as in a straight line L25. The creep strain from t=0 to the rotor life time te1 actually includes the transient creep and the steady creep as shown in FIG. 5, and the strain speed in the transient creep is not constant.

The strain is a time integral of the strain speed, and therefore, a time integral of the inverse value of the rotor life time is an amount acquired by normalizing of a strain amount. Timing when the time integral of the inverse value of the rotor life time reaches one is the timing of a lapse of the rotor life. Note that it is practically useful to multiply a threshold of one by the factor of safety, considering a temperature detection accuracy etc.

As shown in FIG. 6A, the rotor life time is 10 years at Tr=120° C., and is 17 years at Tr=115° C. The inverse values of the rotor life times at rotor temperatures Tr of 120° C. and 115° C. are 0.1 [1/year] and 0.059 [1/year] as shown in FIG. 6B, respectively. When cumulatively used for 10 years at a rotor temperature Tr of 120° C., the rotor life is elapsed, and the time integral of the inverse value of the rotor life time is one. Similarly, when cumulatively used for 15 years at a rotor temperature Tr of 115° C., the rotor life is elapsed, and the time integral of the inverse value of the rotor life time is one.

The rotor temperature Tr actually changes according to a pump operation state, the type of exhausted gas, and a gas flow rate. Thus, data indicating a correlation between the rotor temperature Tr and the inverse value of the rotor life time as shown in FIG. 6B is stored in the storage section 103. The arithmetic section 105 acquires the inverse value of the rotor life time corresponding to the detected rotor temperature Tr from the correlation, and then, calculates the integrated strain value Ld as an integrated value corresponding to the strain. As described above, the data set D(Ld, t) including the calculated integrated strain value Ld and the cumulative rotor drive time t is stored in the storage section 103.

For example, the following case will be considered: the pump is constantly in the operation state after use of the pump rotor 4a has been started, and n data sets D1(Tr1, Δt), D2 (Tr2, 2Δt), . . . , Dn(Trn, nΔt) are sequentially input from the control unit 2 to the communication section 101 at the time interval Δt (the time interval at the cumulative rotor drive time). In this case, the arithmetic section 105 calculates integrated strain values Ld1 to Ldn as shown in Expression (1) described below. The integrated strain values Ld1 to Ldn are each an integrated value corresponding to the time integral of the inverse value of the rotor life time until a cumulative rotor drive time tn(Δt, 2Δt, . . . , nΔt) is elapsed after the start of use of the pump rotor 4a. In Expression (1), f (Tr1) to f(Trn) are each the inverse value of the rotor life time acquired from the correlation of the FIG. 6B.

$$Ld1 = f(Tr1) \cdot \Delta t$$

$$Ld2 = f(Tr1) \cdot \Delta t + f(Tr2) \cdot \Delta t$$

$$Ldn = f(Tr1) \cdot \Delta t + f(Tr2) \cdot \Delta t + \ldots + f(Trn) \cdot \Delta t \quad (1)$$

Note that when rotor rotation is stopped, the cumulative rotor drive time does not increase, and therefore, the data set D(Ld, t) is not updated.

FIG. 7 is a graph of an example of the operation state of the vacuum pump loaded on a semiconductor manufacturing device, and shows a long-term situation for several months to several years. In FIG. 7, (a) represents the rotor rotation speed, (b) represents a motor current value I, (c) represents the rotor temperature Tr, and (d) represents the integrated strain value Ld. Note that a time represented by the horizontal axis is not the cumulative rotor drive time, but a normal time. However, such a time indicates the cumulative rotor drive time at t10 to t12 and t20 for the integrated strain value Ld. A temperature Tmin of FIG. 7 indicates the lower temperature limit (e.g., 120° C.) within a temperature range in which the creep strain speed cannot be ignored. Typically, operation is made at equal to or higher than the lower temperature limit Tmin during the process, and therefore, the integrated strain value Ld gradually increases over time. Moreover, Tmax represents an upper rotor temperature limit allowed for the pump rotor 4a when the creep strain is taken into consideration.

In the example shown in FIG. 7, the rotor temperature Tr slightly changes in an ascending direction around the cumulative rotor drive time t10, and an ascending trend of the integrated strain value Ld also changes. At the cumulative rotor drive time t12, the integrated strain value Ld reaches a life threshold Lde set as the life. The life threshold Lde is a life threshold considering the factor of safety. In the present embodiment, the ascending trend of the integrated strain value Ld is approximated based on multiple data sets Dn(Ldn, tn) stored in the storage section 103, and in this manner, the estimated life t20 as the cumulative rotor drive time until the integrated strain value Ld reaches the life threshold Lde is estimated. The estimated life t20 of FIG. 7 is a life when estimation is made at the cumulative rotor drive time t11.

(Life Estimation Method 1)

Figure 8:
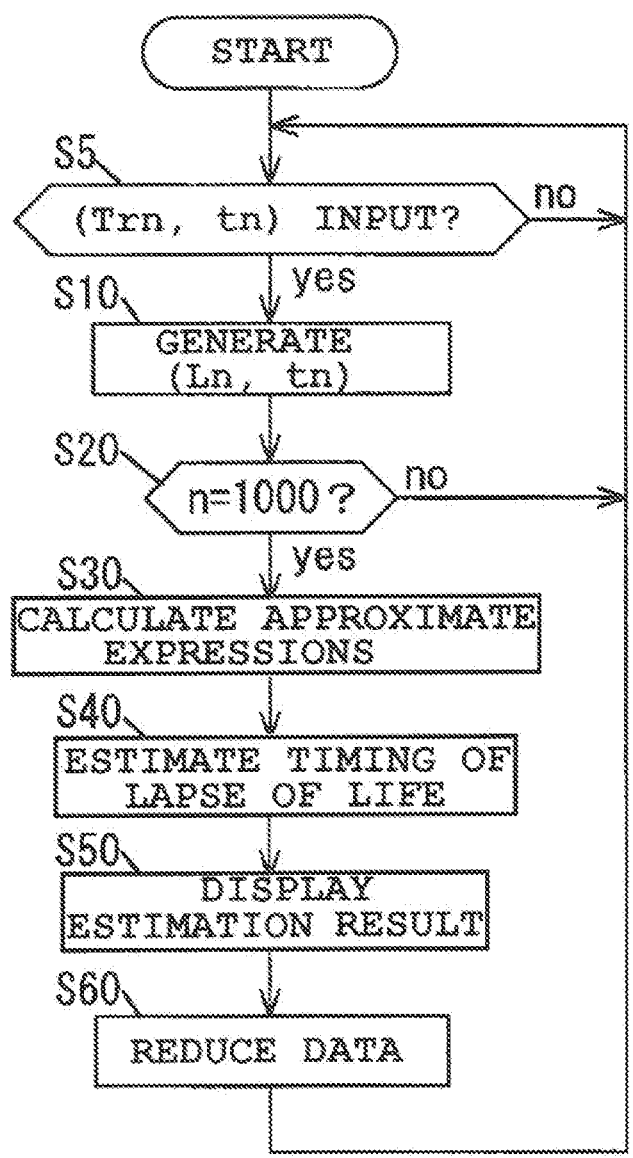
FIG. 8 is a flowchart of an example of life estimation processing.

Next, a first example of the method for estimating the estimated life t20 will be described. FIG. 8 is a flowchart of an example of life estimation processing performed by the rotor life estimation device 100.

First, at a step S5, it is determined whether or not a data set (Trn, tn) on the rotor temperature Tr is input from the control unit 2, and the processing proceeds to a step S10 when it is determined as being input. Note that it is determined as being input when tn increases as compared to a previous value, and it is determined as not being input when tn does not increase (the same as the previous value). At the step S10, the integrated strain value Ldn is calculated for the input data set (Trn, tn), and the data set Dn(Ldn, tn) is generated. The generated data set Dn (Ldn, tn) is stored in the storage section 103.

At a step S20, it is determined whether or not the number n of data sets Dn(Ldn, tn) reaches 1000, i.e., whether or not 1000 data sets D1 (Ld1, t1) to D1000 (Ld1000, t1000) are stored in the storage section 103. The processing proceeds to a step S30 when it is determined as n=1000 at the step S20, and the processing proceeds to the step S5 when the number of data sets does not reach 1000. In the storage section 103, a data storage area for 1000 data sets is, for approximation calculation, ensured as a data storage area for data sets for the integrated strain value Ld.

At the step S30, approximate expressions for estimating a future change in the integrated strain value Ld are calculated in the arithmetic section 105 based on the data sets D1 (Ld1, t1) to D1000 (Ld1000, t1000) stored in the storage section 103. At this step, three types of primary, secondary, and tertiary expressions are calculated as the approximate expressions, but the present invention is not limited to these expressions. Basic expressions of the primary, secondary, and tertiary expressions are set as in Expressions (2) to (4) described below such that each coefficient value is acquired by arithmetic processing employing a least-square method.

$$Ld = b1 \cdot t + a1 \quad (2)$$

$$Ld = c2 \cdot t^2 + b2 \cdot t + a2 \quad (3)$$

$$Ld = d3 \cdot t^3 + c3 \cdot t^2 + b3 \cdot t + a3 \quad (4)$$

Figure 9:
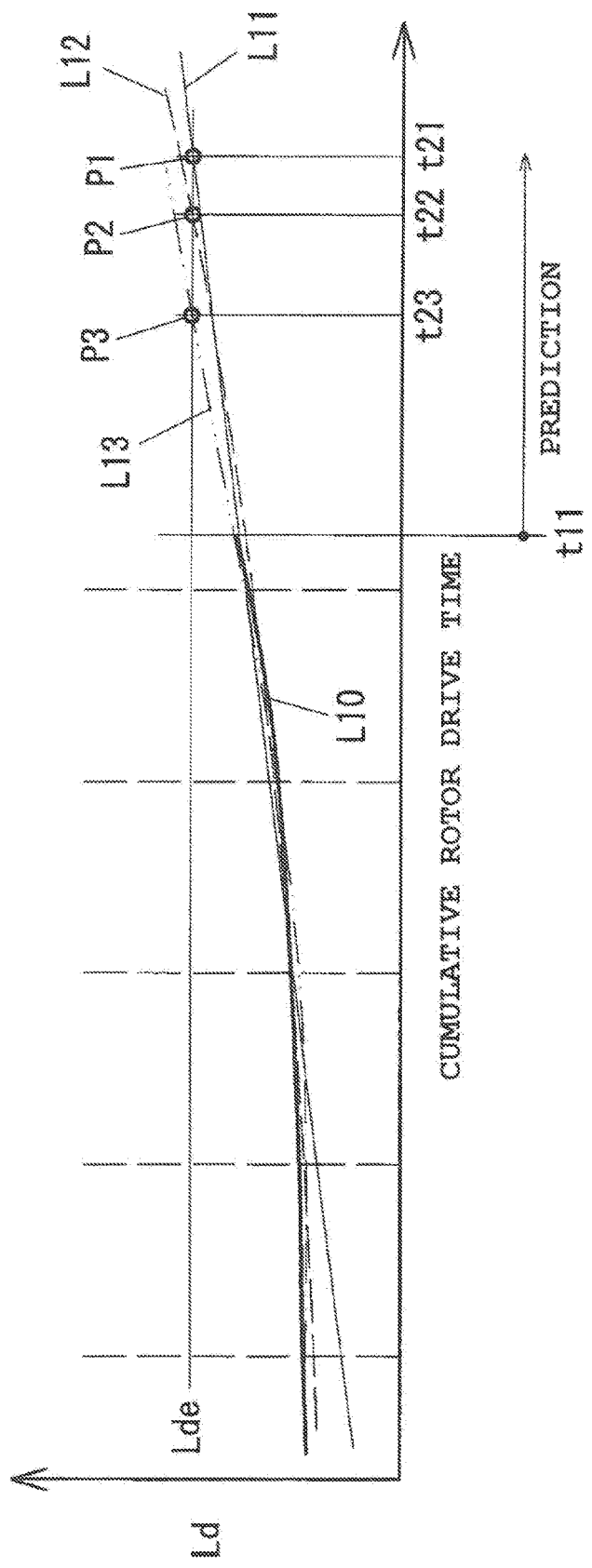
FIG. 9 is a graph of approximate curves L21, L22, L23.

FIG. 9 schematically shows a curve L10 representing the integrated strain values Ld calculated until the cumulative rotor drive time t11 and approximate curves L11, L12, L13 estimated using the primary, secondary, and tertiary expressions based on 1000 data sets D1 (Ld1, t1) to D1000 (Ld1000, t1000) stored in the storage section 103 at the cumulative rotor drive time tn. Note that the curve L10 is the same as the curve of the integrated strain value Ld shown in FIG. 7D, and shows, as a continuous curve, the calculated integrated strain values Ld (discrete values).

At a step S40, the approximate expressions calculated at the step S30 are used to perform arithmetic extrapolation processing for acquiring the cumulative rotor drive time at which the integrated strain value Ld reaches the life threshold Lde of FIG. 7. That is, a point at which each of the approximate curves L11, L12, L13 of the integrated strain value Ld represented by the approximate expressions intersects a line of the life threshold Lde is acquired by, e.g., a bisection method.

In the example shown in FIG. 7D, the curve L10 representing the actually-calculated integrated strain value Ld intersects the line of the life threshold Lde at the cumulative rotor drive time t12. On the other hand, the approximate curve L11, L12, L13 shown in FIG. 9 intersects the line of the life threshold Lde at a point P1, P2, P3. A cumulative rotor drive time t21, t22, t23 at the point P1, P2, P3 is the cumulative rotor drive time until a lapse of the estimated life when the approximate curve L11, L12, L13 is used, i.e., a lapse of the rotor life after assembly of the pump rotor 4a. Note that the condition for passing the vicinity of a present value (the data set at the cumulative rotor drive time t11) may be added such that a present side is more weighted as compared to a previous side.

At a step S50, an estimation result is displayed on the display section 104. For example, as shown in FIG. 9, the following contents may be displayed: the curve L10 showing transition of the integrated strain value Ld up to a present point; the approximate curves L11, L12, L13; and the estimated lives t21, t22, t23 when the approximate curves L11, L12, L13 are employed. Moreover, operable times (t21−t11), (t22−t11), (t23−t11) until the estimated lives t21, t22, t23 may be displayed. Note that the estimated life result may be displayed on the display section 104, or may be output from the output section 108.

Then, the reduction processing of reducing, to 500 data sets, 1000 data sets D1(Ld1, t1) to D1000 (Ld1000, t1000) stored in the storage section 103 is executed in the data processing section 102 at a step S60. By such reduction processing, the data sets stored in the storage section 103 are reduced to 500 data sets, and a free space for 500 data sets is formed in the data storage area. The reduction processing will be described later in detail.

When the reduction processing of the step S60 is completed, the processing returns to the step S5 to newly accumulate 500 data sets in the free space formed by the reduction processing. As described above, approximate expression calculation is performed every time the number of data sets reaches 1000 data sets D1(Ld1, t1) to D1000 (Ld1000, t1000), and the estimated lives t21, t22, t23 are calculated.

(Reduction Processing)

Next, an example of the reduction processing at the step S60 will be described. Note that the reduction processing is performed in the data processing section 102. From the communication section 24 of the control unit 2, n data sets (Trn, tn) are input to the communication section 101 at the predetermined interval Δt. The arithmetic section 105 converts these data sets into n data sets Dn(Ldn, tn).

First, 1000 data sets D1 (Ld1, t1), D2(Ld2, t1+Δt), D3(Ld3, t1+2Δt), D4(Ld4, t1+3Δt), . . . , D999(Ld999, t1+998Δt), D1000(Ld1000, t1+t999Δt) are stored in the storage section 103. By reducing these 1000 data sets D1(Ld1, t1) to D1000(Ld1000, t1+t999Δt), 500 data sets D1((Ld1+Ld2)/2, t1+Δt/2), D2((Ld3+Ld4)/2, t1+(5/2)Δt), . . . , D500((Ld999+L1000)/2, (1997/2)Δt) are generated.

Note that at this step, the average of the integrated strain values is acquired for adjacent two of the data sets. The reduction processing is performed using such an average as the integrated strain value at the cumulative rotor drive time between adjacent two of the data sets. Note that such reduction processing is an example, and various types of reduction processing are available.

After the approximate expressions have been calculated using the above-described 1000 data sets, 500 data sets are newly accumulated in the storage section 103. Thus, the cumulative rotor drive time when a first one of the new 500 data sets is acquired is a cumulative rotor drive time for a data set acquired after a lapse of a time required for approximate expression calculation from a cumulative rotor drive time 999Δt at which the above-described 1000th data set D1000(Ld1000, t1+999Δt) is acquired. In this example, the time required for approximate expression calculation is not taken into consideration, and the cumulative rotor drive time at which the first one of the new 500 data sets is acquired is described as 999Δt+Δt=1000Δt. That is, 500 data sets D1001(Ld1001, 1000Δt), D1002(Ld1002, 1001Δt), . . . , D1500(Ld1500, 1499Δt) are newly stored in the storage section 103.

As a result, 1000 data sets are accumulated in the storage section 103 again. Using these 1000 data sets, approximate expression calculation of the step S30 is performed. Then, in the reduction processing of the step S60, the reduction processing is performed for 1000 data sets D1((Ld1+Ld2)/2, t1+Δt/2), D2((Ld3+Ld4)/2, t1+(5/2)Δt), . . . , D500((Ld999+Ld1000)/2, (1997/2)Δt), D1001(Ld1001, 1000Δt), D1002 (Ld1002, 1001Δt), . . . , D1500(Ld1500, 1499Δt).

Figure 10:
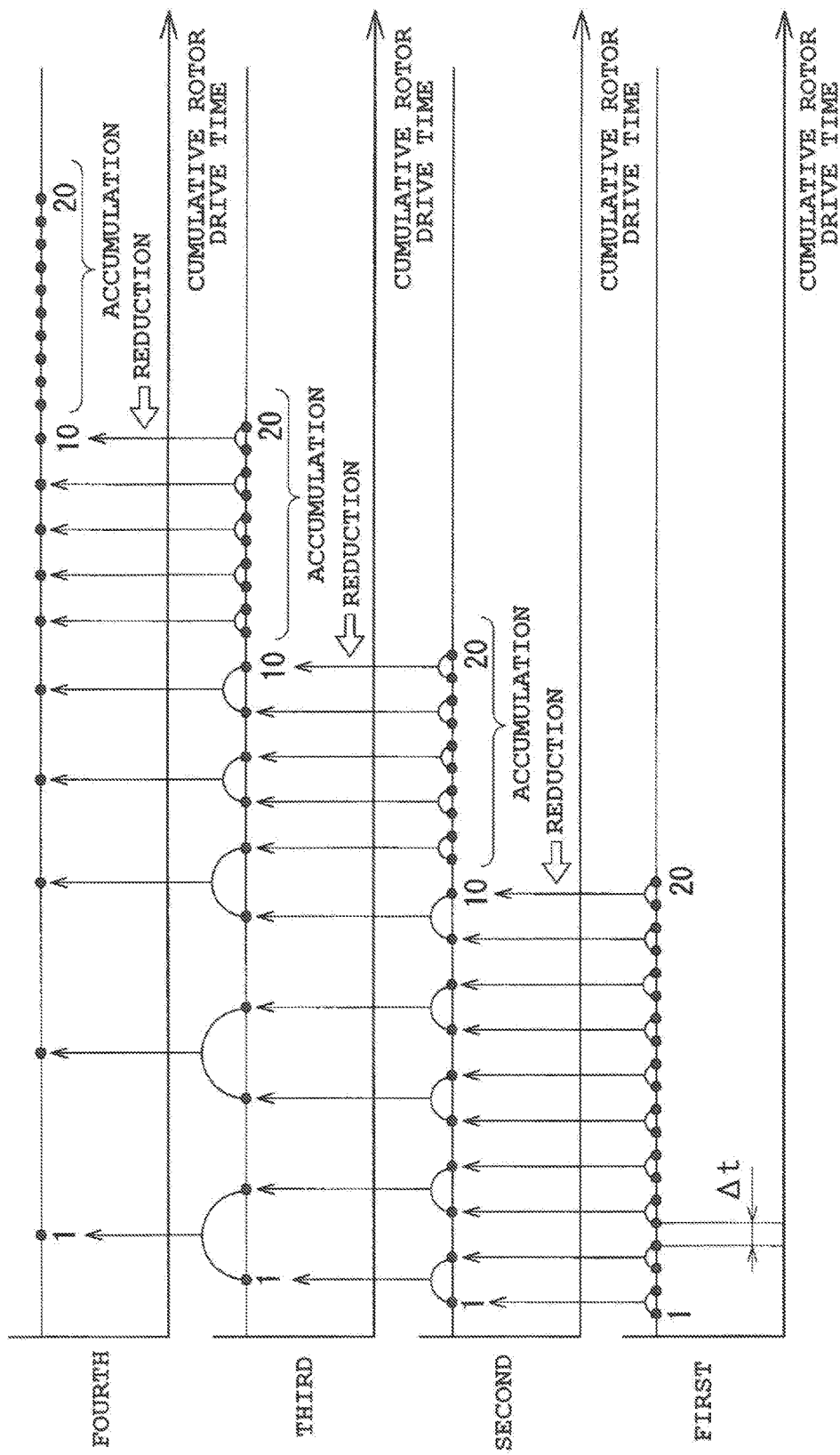
FIG. 10 is a graph for describing reduction processing.

FIG. 10 is a graph for describing the reduction processing. FIG. 10 shows, as an example, the case where 20 data sets can be stored in the data storage area of the storage section 103. In FIG. 10, a black circle represents the data set D(Ldn, tn), and the horizontal axis represents the cumulative rotor drive time. Moreover, a number shown under the black circle represents a sequential order in the data sets Dn(Ldn, tn). In FIG. 10, first to fourth data sets for approximate expression calculation are shown in the order from the lower side to the upper side as viewed in the figure.

In first approximate expression calculation, the approximate expressions are calculated using 20 data sets acquired at the Δt interval. Then, the reduction processing is performed for these 20 data sets. As a result, the 20 data sets are reduced to 10 data sets, and a free space for 10 data sets is formed in the storage section 103. Then, 10 data sets are newly accumulated in such a free space of the data storage area.

In second approximate expression calculation, the approximate expressions are calculated based on the 10 data sets generated by the reduction processing and the newly-accumulated 10 data sets. Subsequently, the reduction processing is performed for these 20 data sets, and a free space for 10 data sets is ensured in the data storage area of the storage section 103. Then, 10 data sets are newly accumulated in such a free space. Third and fourth approximate expression calculations of FIG. 10 are further performed as in the second approximate expression calculation.

(Life Estimation Method 2)

Next, a second method for life estimation will be described. In the above-described estimation method, the approximate curves acquired from the multiple integrated strain values acquired in chronological order are extrapolated, and in this manner, the estimated lives t21 to t23 are acquired. In the second method described below, an estimated remaining life up to the life threshold Lde is acquired based on a present integrated strain value, and in this manner, the timing of a lapse of the life of the pump rotor 4a is estimated.

Figure 11:
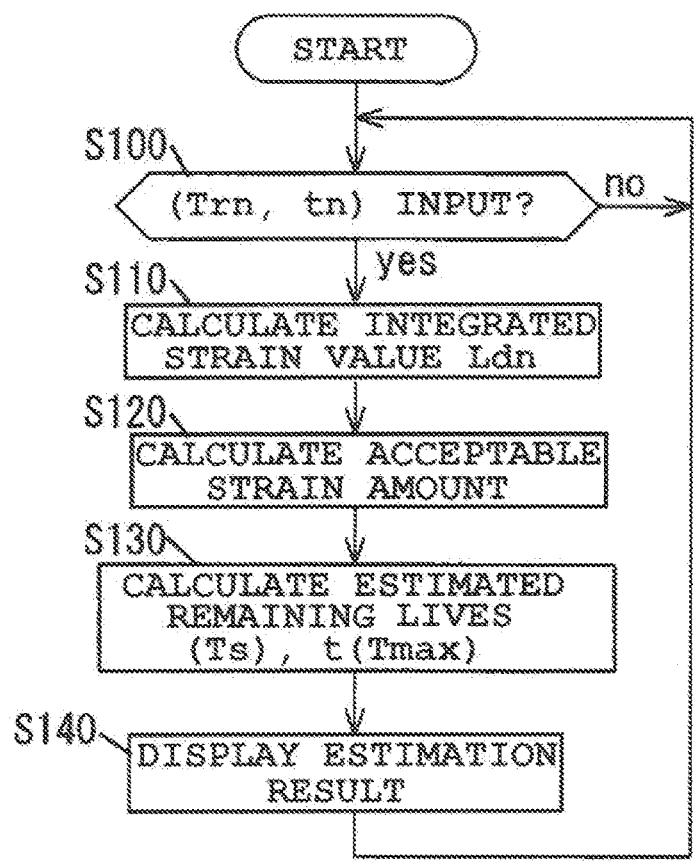
FIG. 11 is a flowchart of an example of estimated remaining life calculation processing.

FIG. 11 is a flowchart of an example of estimated remaining life calculation processing. At a step S100, it is determined whether or not the data set (Trn, tn) on the rotor temperature Tr is input from the control unit 2, and then, the processing proceeds to a step S110 when it is determined as being input. At the step S110, the integrated strain value Ldn at the cumulative rotor drive time tn is calculated as in Expression (5) described below. In Expression (5), f (Tr1) to f (Trn) are each the inverse value of the rotor life time at a corresponding one of the rotor temperatures Tr1 to Trn, the inverse value being acquired from the correlation of FIG. 6B described in the first embodiment.

$$Ldn = f(Tr1) \cdot \Delta t + f(Tr2) \cdot \Delta t + \ldots + f(Trn) \cdot \Delta t \quad (5)$$

At a step S120, an acceptable strain amount (Lde−Ldn) up to the life threshold Lde is calculated for the integrated strain value Ldn calculated at the step S110. At a step S130, the estimated remaining life based on the acceptable strain amount (Lde−Ldn) is calculated. As described above, there is a relationship between the rotor life and the rotor temperature Tr as shown in FIG. 6A. In this example, for each of the case where the rotor temperature Tr is a predetermined temperature Ts and the case where the rotor temperature Tr is an upper rotor temperature limit Tmax, estimated remaining lives Δt(Ts), Δt(Tmax) are acquired as in Expressions (6) and (7) described below. Note that t (Ts) is an estimated life when the rotor temperature Tr is Ts, and t (Tmax) is an estimated life when the rotor temperature Tr is Tmax.

$$\Delta t(Ts) = (Lde - Ldn) \times t(Ts) \quad (6)$$

$$\Delta t(Tmax) = (Lde - Ldn) \times t(Tmax) \quad (7)$$

Note that the predetermined temperature Ts includes, for example, the rotor temperature Tr at the present point, the average of the rotor temperatures Tr up to the present point, and a set value input from the input section 107 in advance.

Figure 12:
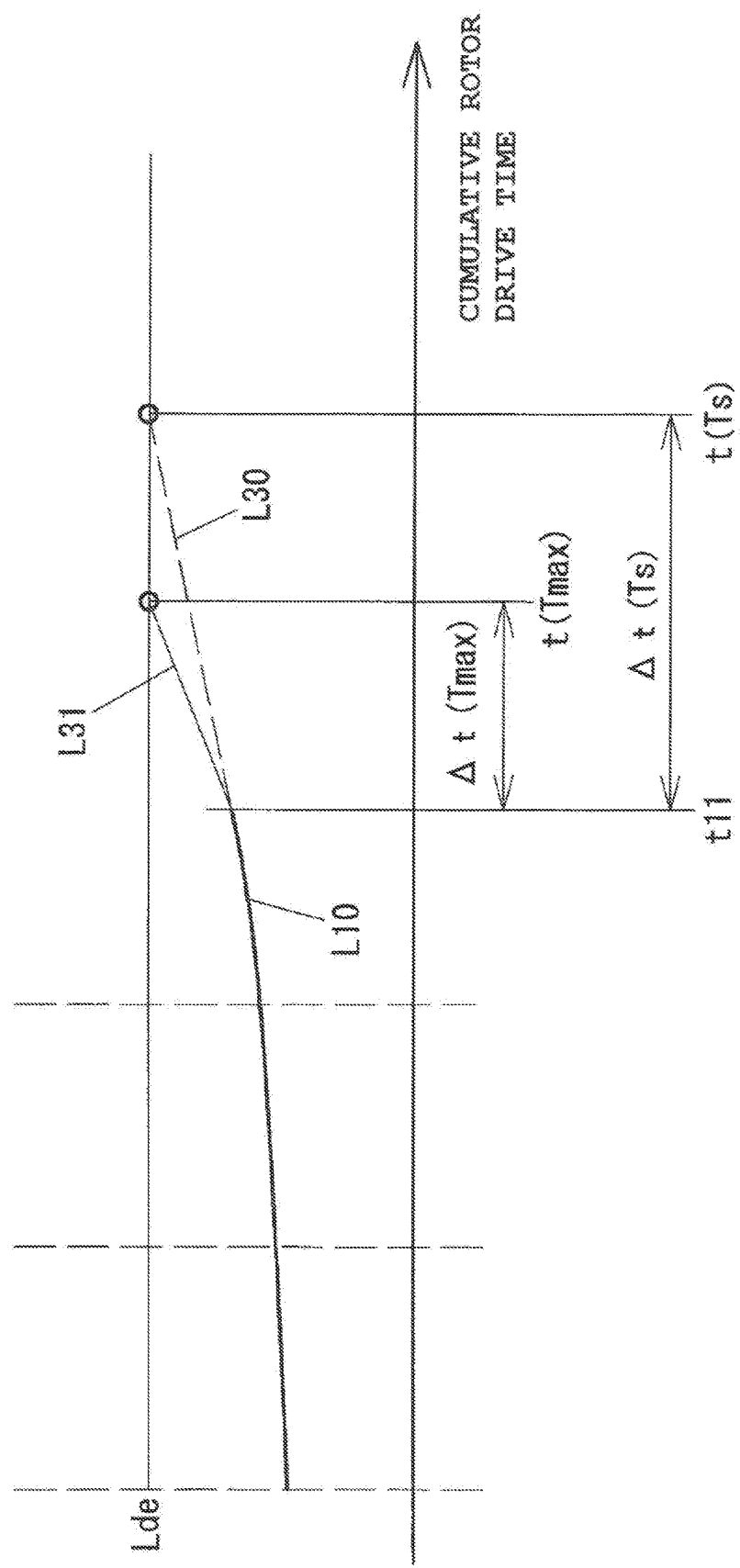
FIG. 12 is a view of a display example of an estimation result.

At a step S140, an estimation result is displayed on the display section 104. FIG. 12 is a view of a display example. The curve L10 representing the integrated strain values up to the present cumulative rotor drive time t11, the estimated lives t (Ts), t (Tmax), line segments L30, L31 representing the strain change starting from the present cumulative rotor drive time t11 for the estimated lives t(Ts), t(Tmax), and the estimated remaining lives Δt(Ts), Δt(Tmax) are displayed.

Note that the second method may be executed in combination with the above-described first estimation method, and the approximate curves L11, L12, L13 may be also displayed on a display screen of FIG. 12.

(Case of Using Detection Time as Time Information)

In the case of using the detection time as the time information, the data set (Tr, t) input from the control unit 2 to the rotor life estimation device 100 is a combination of the rotor temperature Tr and the detection time. As will be seen from a rotor rotation situation for a long period of time in FIG. 7, the rotor rotation speed decreases to zero when the pump is stopped. While the pump is stopped, no creep strain is caused, and therefore, the cumulative rotor drive time is, in description made above, used in the sense of exclusion of such a period. However, the detection time may be used as the time information. In this case, the cumulative rotor drive time t in Expression (1) described above is replaced with the detection time so that the integrated strain value Ldn can be calculated.

Note that in the case of using the detection time as t, integration is executed for the integrated strain value Ldn even with such a rotor rotation speed (e.g., while the pump is stopped) that the creep strain can be almost ignored. That is, the right side of Expression (1) includes a section f(Trn)·Δt based on the rotor temperature Trn detected for such a rotor rotation speed. However, in the case of such a rotor rotation speed, the rotor temperature Trn is often lower than a rotor temperature of 110° C. shown in FIG. 6, and the creep strain is extremely small or can be ignored. That is, the inverse value f (Trn) of the rotor life time is an extremely-small value, and therefore, a difference in the integrated strain value Ldn between the case of using the cumulative rotor drive time and the case of using the detection time is extremely small even with the period for which the pump is stopped, for example. Note that the processing using the integrated strain value Ldn is similar to that in the case of using the cumulative rotor drive time as t, and for this reason, description thereof will not be repeated.

(C1) As described above, the arithmetic section 105 of the rotor life estimation device 100 calculates the integrated strain value Ld as a strain equivalent corresponding to the creep strain of the pump rotor 4a based on the correlation (FIG. 6B) between a creep strain speed equivalent and the temperature of the pump rotor 4a, the rotor temperature Tr detected by the rotor temperature sensor 8, and the cumulative rotor drive time or the detection time as the time information. Then, the arithmetic section 105 estimates, based on the integrated strain value Ld, the rotor life such as the time until the creep strain of the pump rotor 4a reaches the value as the life and the time (the estimated remaining life) from the present point until the creep strain reaches the value as the life. The information on the estimated rotor life is displayed on the display section 104, and is output from the output section 108.

As a result, maintenance such as rotor replacement can be performed before a lapse of the rotor life due to progression of the creep strain.

(C2) The time information may be generated at the timing of temperature detection by the time counting section provided on a vacuum pump side, or may be generated at the timing of acquiring the detection temperature from the vacuum pump side by the time counting section provided at the rotor life estimation device 100. The storage section 103 may be provided, which is configured to store, in the data storage area, the data set D (Ld, t) containing the time information (the detection time or the cumulative rotor drive time) t and the integrated strain value Ld for each rotor temperature Tr detected over time by the rotor temperature sensor 8. The arithmetic section 105 may estimate a temporal change in a future integrated strain value Ld based on the multiple data sets D (Ld, t) stored in the storage section 103, and may estimate the rotor life when the future integrated strain value Ld reaches the life threshold Lde set as the rotor life.

(C3) Of the multiple data sets D (Ld, t), the data set D (Ld, t) including the time information closer to the time estimated by the arithmetic section 105 may be more weighted in the data processing section 102.

(C4) For example, as shown in FIG. 9, the averaging processing of reducing the number of multiple data sets Dn (Ldn, tn) stored in the storage section 103 is performed, and the data sets are newly stored in the free space of the data storage area generated by the averaging processing. By such data processing, the rotor life close to the latest use trend can be estimated, and the storage area of the storage section 103 can be saved.

(C5) Based on the difference between the life threshold Lde as a strain equivalent threshold set as the rotor life and the integrated strain value Ld, the remaining life as the cumulative rotor drive time from the present point to a lapse of the rotor life may be estimated.

Second Embodiment

In the above-described first embodiment, the life is estimated using the acquired integrated strain value. However, in a second embodiment, the amount of strain of a pump rotor 4a in an overhaul of a vacuum pump is actually measured, and a rotor life is estimated based on the actually-measured strain amount.

In a turbo-molecular pump used in an etching process for use application of a semiconductor FPD, a reactive product is easily deposited, and for this reason, the overhaul operation of cleansing and removing the deposited substance is typically performed on a regular basis. Thus, in the present embodiment, the strain of the pump rotor 4a is actually measured at the timing of the overhaul, and the rotor life is estimated using such actual measurement data.

Figure 13:
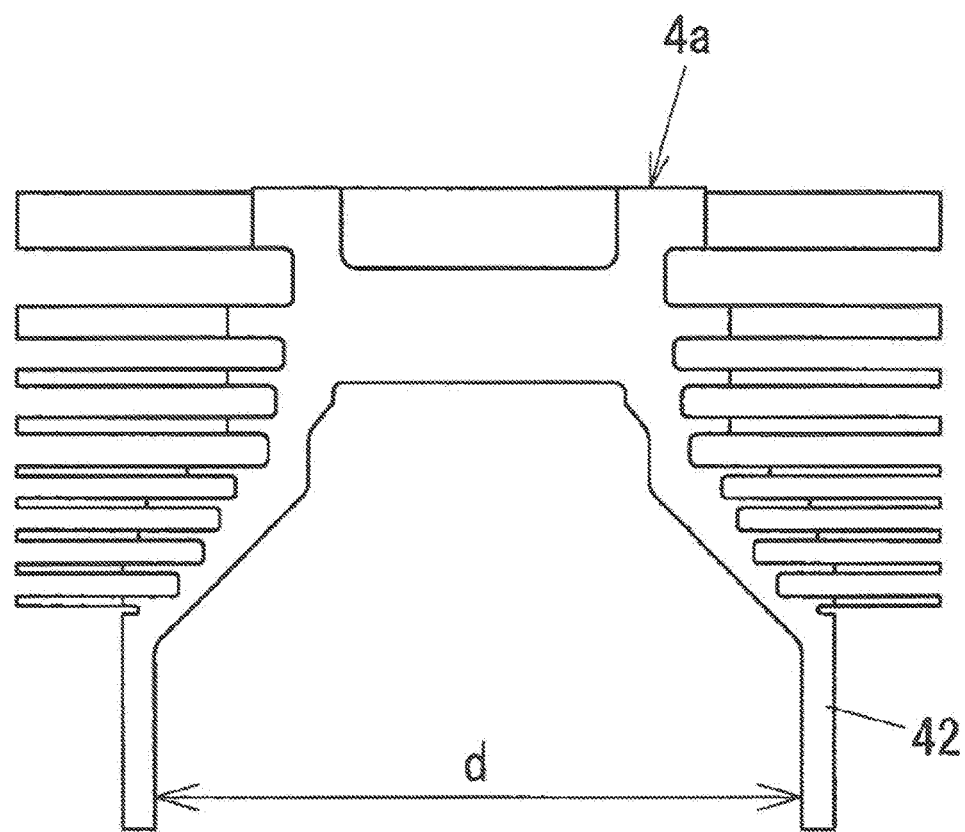
FIG. 13 is a view of an example of a strain measurement portion of a pump rotor.

For example, as shown in FIG. 5, the overhaul is performed at each of cumulative rotor drive times to1, to2, to3, to4. Then, the dimensions of the pump rotor 4a are measured at each of the time of initial assembly (corresponding to t=0) and the cumulative rotor drive times to1, to2, to3, to4 at which the overhaul is performed. A portion for which measurement is performed is preferably a location where creep strain is greatest. The location with the greatest creep strain is known at the stage of designing, and for this reason, there are no obstacles to measurement. Considering time and effort for measurement, a easily-measurable portion where a strain relationship with the portion with the greatest strain is clearly recognized may be targeted for measurement. For example, an inner-diameter dimension d at a portion close to a lower end of a cylindrical portion 42 of the pump rotor 4a as illustrated in FIG. 13 is measured.

When the inner-diameter dimension at the time of initial assembly is d0 and the inner-diameter dimension measured at a n-th (a cumulative rotor drive time ton) overhaul is dn, permanent strain (the creep strain) εpn is represented by Expression (8) described below.

$$\varepsilon pn = (dn - d0)/d0 \qquad (8)$$

The permanent strain εpn is represented by the sum (εt+εsn) of transient creep strain εt and steady creep strain εsn. The transient creep strain εt generated at an initial stage of pump operation is separately acquired in such a manner that actual measurement is made by a trial or that arithmetic processing is performed by simulation. In the present embodiment, the rotor life is estimated using the steady creep strain εsn (=εpn−εt) acquired by subtraction of the separately-acquired transient creep strain εt from the permanent strain εpn acquired by actual measurement. As shown in FIG. 5, the strain speed of the steady creep is substantially constant, and therefore, only the steady creep strain εsn is extrapolated and approximated so that an approximation accuracy is more enhanced.

A procedure will be described as follows.

First, the inner-diameter dimension d is measured at the time of initial assembly. The measured inner-diameter dimension is, as a default d0 of the actually-measured inner-diameter dimension, manually input to an input section 107 of a rotor life estimation device 100. The rotor life estimation device 100 calculates a permanent strain εp0 from the input default d0 based on Expression (8). In this case, εp0=0 is satisfied, and therefore, a data set (0, 0) is stored in a storage section 103. When operation begins after loading of the vacuum pump on the device, a time counting section 25 of a control unit 2 starts counting the cumulative rotor drive time based on motor rotation information from a motor control section 20. While the pump is stopped, the cumulative rotor drive time at this point is temporarily stored in a storage section (not shown) of the time counting section 25. When pump operation is resumed, the cumulative rotor drive time stored in the storage section is read, and measurement of the cumulative time is resumed.

Then, the inner-diameter dimension d of the pump rotor 4a is measured in a first overhaul. An operator powers on the control unit 2, and then, an actually-measured inner-diameter dimension d1 is manually input to the rotor life estimation device 100. Note that in the present embodiment, the rotor life estimation device 100 is also configured such that power is supplied from the control unit 2. When the control unit 2 is powered on, the rotor life estimation device 100 is also turned on. When the actually-measured inner-diameter dimension d1 is input to the rotor life estimation device 100, the rotor life estimation device 100 performs the following life estimation processing.

The rotor life estimation device 100 calculates permanent strain εp1 from Expression (8) based on the actually-measured inner-diameter dimension d1, and steady creep strain εs1 (=εp1−εt) is acquired based on the calculated permanent strain εp1 and the transient creep strain εt stored in the storage section 103 in advance. The rotor life estimation device 100 acquires the cumulative rotor drive time to1 from the time counting section 25, and stores a data set (εs1, to1) including the steady creep strain εs1 and the accumulated operation time to1 in the storage section 103. An arithmetic section 105 acquires, by, e.g., a least-square method, an extrapolation approximation function E(t) based on two data sets (0, 0), (εs1, to1).

Figure 14:
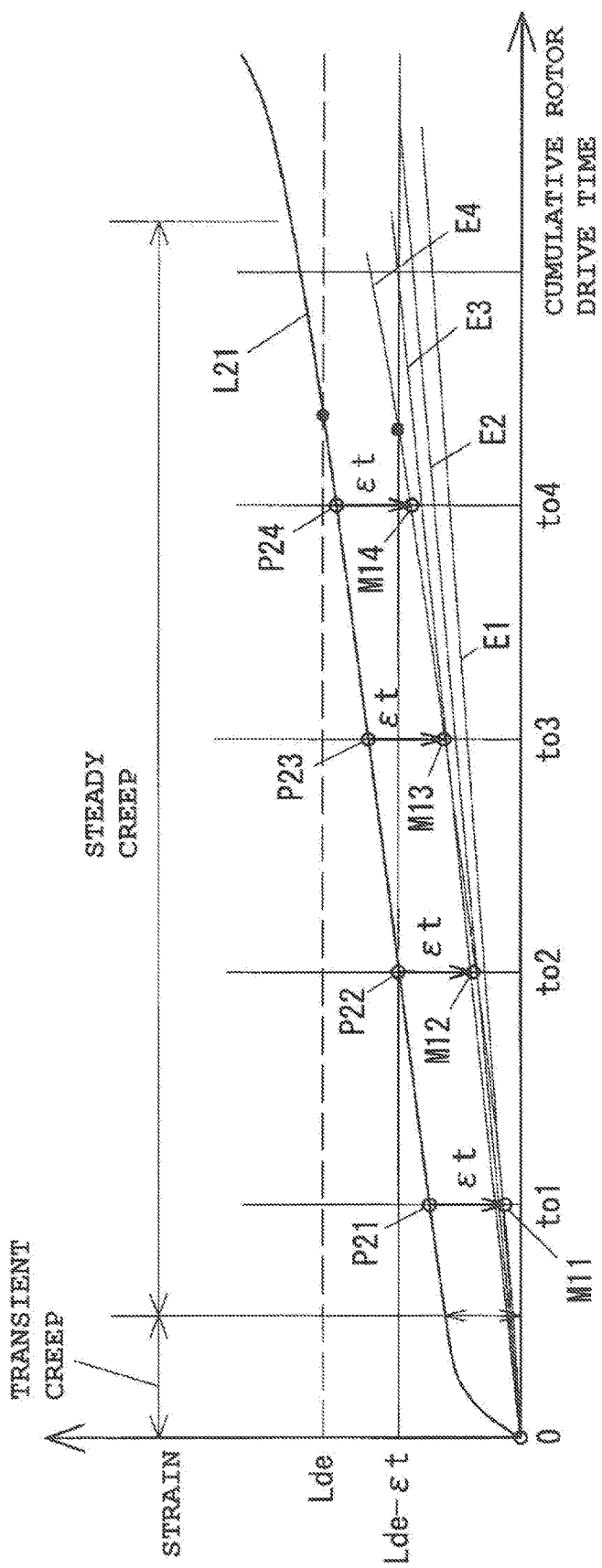
FIG. 14 is a graph of an example of an extrapolation approximation function E(t)

Although will not be described, second, third, fourth, . . . overhauls are performed as in the first overhaul. FIG. 14 is a graph of the extrapolation approximation function E(t), and lines E1, E2, E3, E4 represent extrapolation approximation functions E (t) acquired by the first, second, third, and fourth overhauls. Moreover, a curve L21 is the same as the curve L21 shown in FIG. 5. The lines E1 to E4 representing the extrapolation approximation functions E (t) relate to the steady creep strain, and therefore, a line representing a life threshold for these lines E1 to E4 is represented by Lde−εt.

The strain at points P21, P22, P23, P24 on the curve L21 corresponds to the permanent strain εpn based on the inner-diameter dimension do actually measured in the overhaul (the cumulative rotor drive times are to1, to2, to3, to4). A value acquired by subtraction of the transient creep strain εt from each permanent strain εp1, εp2, εp3, εp4 is an actual measurement value of the steady creep strain. Marks M11 to M14 represent the steady creep strain actually measured in each overhaul. Moreover, an intersection point between each of the lines E1 to E4 and the line Lde–ct representing the life threshold represents the rotor life.

For example, the line E1 of the approximation function based on the actual strain measurement value in the first overhaul intersects, as viewed in the figure, the life threshold line Lde–εt on the right side of the cumulative rotor drive time to2 at which the subsequent (the second) overhaul is expected. Thus, there is no probability that the rotor life is elapsed until the subsequent overhaul. The rotor life estimation device 100 displays an estimation result on a display section 104. The estimation result includes, for example, the line E1, the life threshold line Lde–ct, the mark M11 representing the actual measurement value of the steady creep strain, and an operable time until a lapse of the rotor life as shown in FIG. 14. The operable time is displayed as a difference between the rotor life estimated from the line E1 and the cumulative rotor drive time in the overhaul.

On the other hand, the line E4 of the approximation function in the fourth overhaul intersects the life threshold line Lde–ct before the subsequent (the fifth) overhaul, and there is a probability that the rotor life is elapsed before the subsequent overhaul. Thus, when such an estimation result is displayed on the display section 104, the operator can recognize rotor replacement timing. Rotor replacement processing performed based on such life estimation can prevent a lapse of the rotor life during pump operation.

Note that the case where the cumulative rotor drive time is used as time information has been described as an example in the above-described second embodiment. However, as in the first embodiment, a detection time may be used as the time information instead of using the cumulative rotor drive time.

(C6) In the above-described second embodiment, the arithmetic section 105 estimates a remaining rotor life until a lapse of the rotor life from an actual measurement point based on multiple data sets (εsn, ton) including actual strain measurement data of the pump rotor 4a which can be acquired at the timing of maintenance for deposited substance removal or the timing of pump disassembly such as an overhaul and the time information (the detection time or the cumulative rotor drive time) in actual strain measurement. The information on the estimated remaining rotor life is displayed on the display section 104, or is output from an output section 108.

As a result, it can be determined whether or not the rotor life is elapsed until subsequent maintenance timing, and this can prevent a lapse of the rotor life during pump operation.

Third Embodiment

Figure 15:
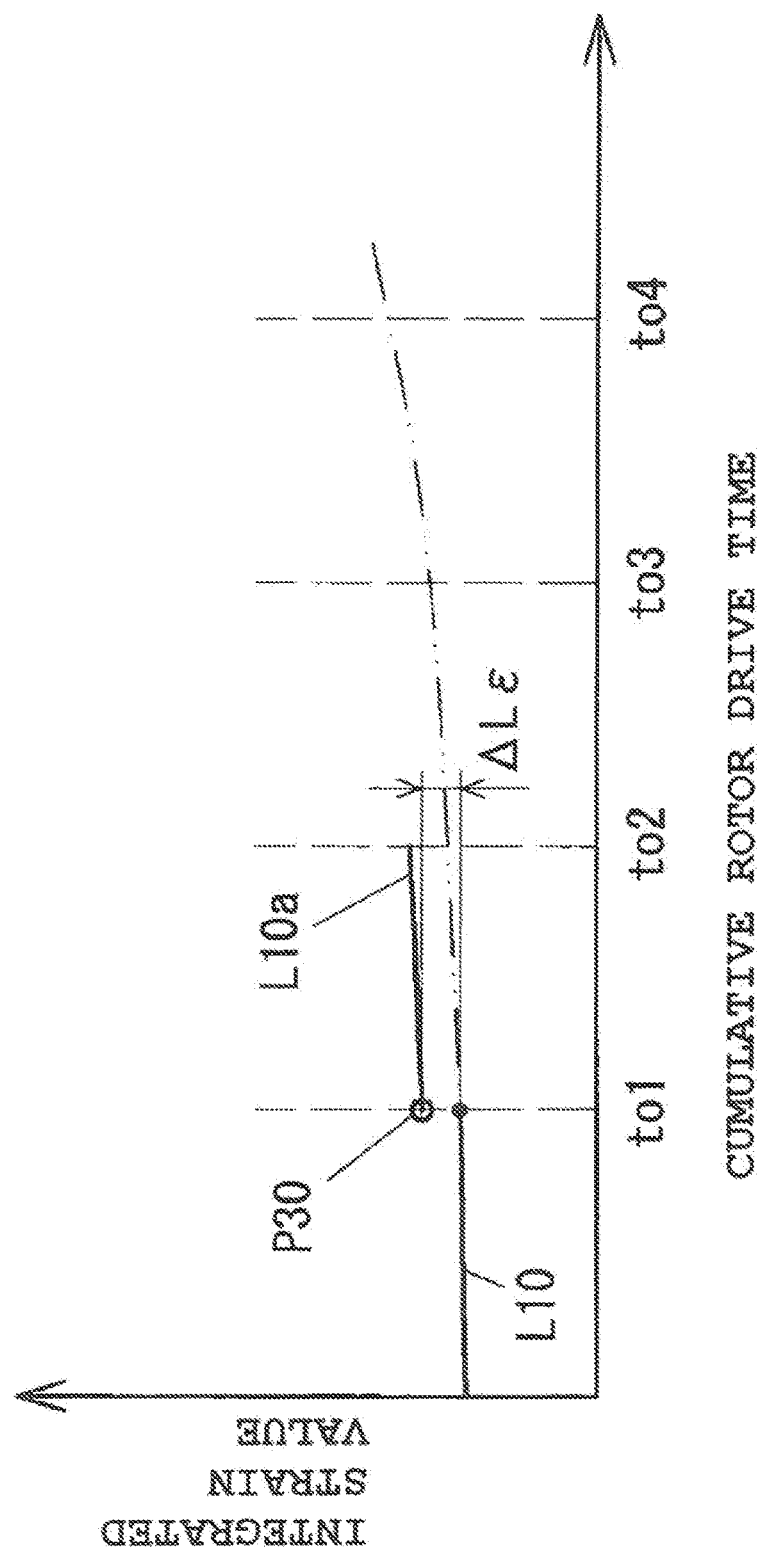
FIG. 15 is a graph for describing a third embodiment.

A third embodiment is a combination of the above-described first and second embodiments, and is configured such that an integrated strain value is corrected by permanent strain εpn actually measured in an overhaul. FIG. 15 is a graph for describing the third embodiment, and a curve L10 is a curve representing the integrated strain value Ld shown in FIG. 9. The integrated strain value Ld is set as one when permanent strain εp reaches strain (life strain) upon a lapse of a rotor life. Thus, (Permanent Strain εp)/(Life Strain) corresponds to the integrated strain value Ld.

As described above, in a first overhaul, an inner-diameter dimension d is actually measured such that an actual measurement value of permanent strain εp1 caused until the first overhaul after assembly is acquired. A mark P30 represents (Permanent Strain εp1)/(Life Strain) for the permanent strain εp1 actually measured in the first overhaul. In an example shown in FIG. 15, there is a gap of ΔLε between the integrated strain value Ld acquired by arithmetic processing and (Permanent Strain εp1)/(Life Strain). Such a gap ΔLε corresponds to an arithmetic error of the integrated strain value Ld.

When an operator inputs an actually-measured inner-diameter dimension d1 to an input section 107 of a rotor life estimation device 100, an arithmetic section 105 calculates the gap ΔLε, and such a gap ΔLε is stored in a storage section 103. After the first overhaul, the integrated strain value Ld calculated using the inverse value of the rotor life time of FIG. 6B is corrected as in Ldr=Ld+ΔLε. Using the corrected integrated strain value Ldr, rotor life estimation described in the first embodiment is performed. A curve L10a of FIG. 15 represents the corrected integrated strain value Ldr. Although will not be described, similar correction processing is also performed based on an actually-measured inner-diameter dimension do in overhauls after a second overhaul.

In the third embodiment, the integrated strain value Ld is corrected using the actual strain measurement value so that the arithmetic error of the integrated strain value Ld can be corrected. As a result, rotor life estimation can be performed with a higher accuracy.

(Variations)

In the configuration illustrated in FIG. 1, the data set (Tr, t) is input from the control unit 2 to the rotor life estimation device 100. However, the rotor temperature Tr may be input from the control unit 2 to the rotor life estimation device 100, and the time at which the rotor temperature Tr is input may be generated as the time information in the rotor life estimation device 100. Then, based on a data set including the input rotor temperature Tr and the generated time information, the data set D(Ld, t) may be generated. The processing using the data set D (Ld, t) is similar to that in the above-described embodiments.

Moreover, in the configuration illustrated in FIG. 1, the data set D(Ld, t) is generated in the rotor life estimation device 100. However, the data set D(Ld, t) may be generated in an arithmetic section provided at the control unit 2. In this case, the correlation shown in FIG. 6B is preferably stored in a storage section of the control unit 2. Alternatively, a storage section storing the correlation may be provided at the pump main body 1, and the correlation may be read from the pump main body to the control unit 2. As another alternative, the rotor life estimation device 100 and the control unit 2 may be integrally configured.

Various embodiments and variations have been described above, but the present invention is not limited to these contents. For example, the present invention is not limited to the turbo-molecular pump, and is also applicable to other vacuum pumps. Other aspects conceivable within the scope of the technical idea of the present invention are also included in the scope of the present invention.

What is claimed is:

1. A vacuum pump comprising:
    a rotor rotatably driven by a motor;
    a sensor configured to detect a temperature of the rotor; and
    a rotor life estimation device comprising:
        a timer;
        a processor configured to:
            store data indicating a correlation between the temperature of the rotor and an inverse value of the rotor life time in a storage;
            receive from the sensor a detected temperature of the rotor;

receive from the timer time information indicating when the received temperature of the rotor is detected by the sensor;

acquire the inverse value of the rotor life time corresponding to the received rotor temperature from the correlation;

calculate a strain integrated value corresponding to the time integral of the inverse value of the rotor life time;

estimate a rotor life based on the calculated strain integrated value; and output information on the estimated rotor life.

2. The vacuum pump according to claim 1, wherein:

the storage is configured to store a plurality of data sets each including the time information and the strain integrated value for a plurality of temperatures detected over time by the sensor, and the processor is further configured to:

estimate a temporal change in a future strain integrated value based on the plurality of data sets stored in the storage, and estimate the rotor life when the future strain integrated value reaches a strain integrated value threshold set as the rotor life.

3. The vacuum pump according to claim 2, wherein the processor is further configured to:

weight more a data set including the time information closer to a time estimated by the processor, the data set being included in the plurality of data sets.

4. The vacuum pump according to claim 3, wherein the processor is further configured to perform averaging processing to reduce the number of the plurality of data sets stored in the storage and newly store data sets in a free space of the storage generated by the averaging processing.

5. The vacuum pump according to claim 2, wherein the time information is a cumulative rotor drive time as a cumulative value of a time for which the rotor is rotatably driven under a predetermined condition.

6. The vacuum pump according to claim 1, wherein:

the storage is configured to store a plurality of data sets each including the time information and the strain integrated value for a plurality of temperatures detected over time by the sensor; and the processor is further configured to:

estimate a temporal change in a future strain integrated value based on the plurality of data sets stored in the storage, and estimate the rotor life when the future strain integrated value reaches a strain integrated value threshold set as the rotor life.

7. The vacuum pump according to claim 6, wherein the processor is further configured to:

weight more a data set including the time information closer to a time estimated by the processor, the data set being included in the plurality of data sets.

8. The vacuum pump according to claim 7, wherein the processor is further configured to perform averaging processing to reduce the number of the plurality of data sets stored in the storage and newly store data sets in a free space of the storage generated by the averaging processing.

9. The vacuum pump according to claim 7, wherein the time information is a cumulative rotor drive time as a cumulative value of a time for which the rotor is rotatably driven under a predetermined condition.

10. The vacuum pump according to claim 1, wherein the processor is further configured to estimate a remaining life from an estimation point to a lapse of the rotor life based on a difference between a strain integrated value threshold set as the rotor life and the strain integrated value.

11. The vacuum pump according to claim 1:

further comprising an input configured to receive actual strain measurement data of the rotor; and wherein the processor is further configured to correct the calculated strain integrated value based on the actual strain measurement data received by the input.

* * * * *